United States Patent [19]

Allen

[11] Patent Number: 5,047,133

[45] Date of Patent: Sep. 10, 1991

[54] GAS ELECTRODE ASSEMBLY FOR USE IN ELECTROCHEMICAL CELLS AND METHOD

[75] Inventor: Robert J. Allen, Saugus, Mass.

[73] Assignee: Metallgesellschaft Aktiengesellschaft, Frankfurt am Main, Fed. Rep. of Germany

[21] Appl. No.: 545,761

[22] Filed: Jun. 28, 1990

Related U.S. Application Data

[63] Continuation of Ser. No. 315,936, Feb. 27, 1989, abandoned.

[51] Int. Cl.[5] .................... C25B 11/02; C25C 7/00
[52] U.S. Cl. .................... 204/258; 204/282; 204/283; 204/290 R
[58] Field of Search .................. 204/98, 128, 105 M, 204/106, 114, 108 R

[56] References Cited

U.S. PATENT DOCUMENTS

| | | | |
|---|---|---|---|
| 3,981,745 | 9/1976 | Stedman | 204/266 |
| 4,248,682 | 2/1981 | Lindstrom et al. | 204/114 |
| 4,293,396 | 10/1981 | Allen et al. | 204/106 |
| 4,498,942 | 2/1985 | Asano et al. | 204/283 |
| 4,614,575 | 9/1986 | Juda et al. | 204/284 |
| 4,675,094 | 6/1987 | Kaminaga et al. | 204/294 |

Primary Examiner—John F. Niebling
Assistant Examiner—Kathryn Gorgos
Attorney, Agent, or Firm—Herbert Dubno

[57] ABSTRACT

A novel plenum-free gas diffusion electrode assembly, and cells utilizing the same, embodying a catalyzed preferably carbon cloth or paper sheet contacting on one side a solid metal supporting current colleetor sheet, as with the aid of a conductive adhesive layer, and preferably though not always essentially carrying an electrolyte-permeable aqueous polymeric hydrogel coating on the other side, with the current collector sheet provided with gas (e.g., hydrogen, oxygen or air) inlet openings occupying a very minor portion of the surface of the current collector sheet.

13 Claims, 1 Drawing Sheet

GAS ELECTRODE ASSEMBLY FOR USE IN ELECTROCHEMICAL CELLS AND METHOD

This is a continuation of co-pending application Ser. No. 07/315,936 filed on 27 Feb. 1989, now abandoned.

FIELD OF THE INVENTION

The present invention relates to electrode assemblies for use in electrochemical cells employing gas diffusion electrodes in aqueous electrolyte solutions and, more particularly, to hydrogen anodes and/or oxygen (air) cathodes and associated current collectors for use in electrolysis cells, such as in metal recovery cells, fuel cells, batteries and other electrochemical cells requiring high gas utilization in combination with low electrical contact resistance between, for example, the catalyzer electrode sheet or surface and the current collectors.

BACKGROUND OF THE INVENTION

In prior art electrocatalytic gas diffusion electrodes or structures of electrochemical cells and the like, gas has been fed or applied by one of three modes. For example, a plenum can be filled with gas in contact with substantially all of one face of an electrocatalytic electronically conducting gas-porous substrate, such as carbon cloth, with the other face being in contact with the electrolyte of the cell (as, for example, in commonly owned U.S. Pat. No. 4,331,520. Alternatively, the gas can be mixed; with an electrolyte solution external to or in the cell and the "mixed phase" can be caused to flow over or through the faces of the electrocatalytic structure (as, for example, in commonly owned U.S. Pat. No. 4,422,911. More recently, the gas has been exposed only to the edge or rim portion of the electrocatalytic electrode in a chamber external to and isolated from the electrolyte, as in commonly owned U.S. Pat. No. 4,478,696.

In U.S. Pat. No. 4,248,682, gas diffusion/current collector electrode assemblies are described which involve electrocatalytic carbon cloths and a variety of gas-permeable metallic current-collecting means designed to allow gas access to the cloth through the current collector by the first of the three above-mentioned gas-accessing modes.

OBJECTS OF THE INVENTION

An object of the invention is to provide a new and improved gas-diffusion electrode assembly of the character described and a novel method of plenum-free utilization of the gas, with the concomitant advantages of high active gas economy and very low contact resistance for current collection.

A further object is to provide such a novel gas electrode assembly employing catalyzed carbon cloth or the like and with optimal mechanical cloth support and full sheet electronic conductance.

Still an additional object is to provide improved hydrogen and oxygen (air) cathode assemblies.

Another object is to provide improved electrochemical cell operation through utilization of the novel plenum-free gas-diffusion electrode assemblies of the invention and in such applications as metal recovery, fuel cell, battery, chlorine/alkali and other electrolysis and electrochemical cell operations.

SUMMARY OF THE INVENTION

It has now been found, surprisingly, that with novel electrode assembly constructions and operation, no external or other separate gas chamber plenum or mixing is needed and that the gas may be fed to but a small portion of the electrocatalytic carbon cloth or similar substrate that is fully in contact with the electrolyte on one side, with the gas applied, for example, by a thin groove in a full sheet current collector electrically contacting the substrate. When this assembly is immersed in the electrolyte solution, the gas is carried from the groove within the carbon cloth or the like and distributes itself substantially uniformly throughout the submerged face of the same. By appropriate pressure control, the gas pressure has been found to be adjustable to attain the required three-phase contact between the active gas, the solid electrocatalyst and the electrolyte solution. By providing electrical contact between almost the entire surface of the full sheet and that of the cloth, optimal electronic contact is obtained and with the full sheet conductor acting as a mechanical support for the cloth as well.

For the preferred purposes of this invention, moreover, the electrode current collector is a full sheet that is electronically conducting, preferably metallic, and is gas-impermeable and liquid-impermeable. In one type of cell, it may serve as a bi-polar plate between more than one cell in a series, with the current flowing transversely across the plate. In another type of cell, the full sheet may have the voltage applied to its edge, thereby acting as an edge current collector. In both cases, however, the full sheet is in electrical contact with an electrocatalytic gas-carrying electronically conducting substrate, such as the carbon cloth or the like.

One of the cells particularly suited for the assembly of this invention is the aforementioned metal electrowinning cell employing a hydrogen anode, such as is used in zinc recovery as described in commonly owned U.S. Pat. No. 4,412,894. In this kind or electrolysis, it has been found desirable, moreover, to apply a gas-confining coating, for example a polymeric hydrogel membrane, to the electrolyte-facing surface of the cloth, as described in commonly owned U.S. Pat. No. 4,61,575, in order to minimize hydrogen losses.

While the present invention, in preferred form, uses such hydrogel-coated catalyzed carbon sheet electrode structures, it does so, however, in a very different and unexpected manner, and with the aforementioned plenum-free gas diffusion operation that surprisingly also does not require the external edge feed of U.S. Pat. No. 4,478,696. More specifically, in accordance with the invention in one of its preferred forms, it has now been found that unitary structures can be assembled which comprise such a hydrogel-coated catalyzed carbon cloth sheet-based electrode, as before mentioned, contacting a full metal sheet by means, for example, of a conducting adhesive or glue, while leaving but a minor portion of the metal sheet provided with gas-accessing apertures (such as said groove) for gas transport into the catalyzed electrode sheet. This assembly satisfies admirably the needs of both gas economy and minimal contact resistance, since, fortuitously, the catalytic coating has been found not to interfere with the gas-carrying capability of the cloth.

SUMMARY OF THE INVENTION

In summary, in one of its broadest aspects, the invention embraces a plenum-free gas diffusion electrode assembly having, in combination, an electrocatalytic gas-diffusing electrode sheet conductively contacting on one side, a supporting current collector sheet throughout its extent. The current collector has one or more narrow inlet gas flow openings occupying a very minor portion of its surface and communicating with adjacent corresponding narrow portions of the electrode sheet. When gas economy is desired, the electrocatalytic sheet is covered on the other side by a gas-confining coating, such as a polymeric hydrogel membrane.

BRIEF DESCRIPTION OF THE DRAWING

The invention is described below with reference to the accompanying drawing illustrating the invention as applied to a hydrogen anode assembly, it being understood, however, that this is only by way of illustration and that the invention is not limited thereto. In the drawing

DESCRIPTION OF PREFERRED EMBODIMENTS

Figure 1:
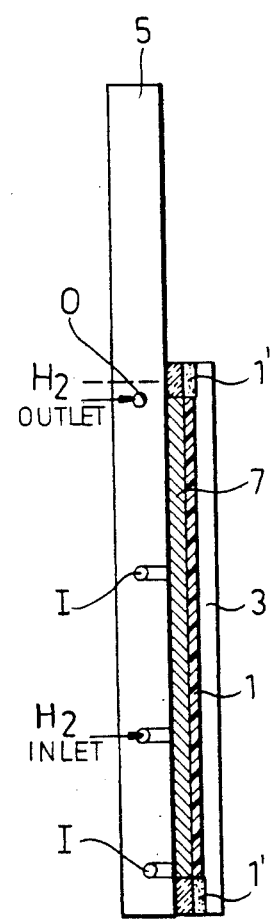
FIG. 1 is a side elevational view of an electrode assembly constructed and operated in accordance with a preferred form of the invention.

Referring to FIG. 1, the invention is shown, for purposes of example, as applied to a hydrogen anode for zinc, manganese, cadmium and similar metal recovery cells, through it is to be understood that such use is illustrative only. The catalyzer carbon cloth or paper or similar substrate constituting an electrode sheet is shown at 1 in FIG. 1 carrying a mixture of "Teflon" (polytetrafluoroethylene), Pt and/or Pd particles, such as of the type described in U.S. Pat. No. 4,331,520, or some other suitable catalyzer porous electrode structure. Such an electrocatalytic carbon cloth or the like is described in U.S. Pat. Nos. 4,248,682; 4,293,396; and 4,647,359. On its side facing the cell electrolyte E (on the right in FIG. 1), the electrode sheet 1 is shown to bear a gas-confining coating, for example the aforementioned aqueous polymeric hydrogel layer or membrane 3 applied as described in U.S. Pat. No. 4,614,575. The membrane, again by way of example only, may be of the type described in U.S. Pat. Nos. 4,331,783; 4,337,327; 4,379,874 to V. A. Stoy (more particularly, for instance, the gel of Examples 1 or 2 of U.S. Pat. No. 4,614,575).

Other gas-confining coatings are also suitable for the purpose of attaining gas economy and/or ready gas recirculation. For example, a coating comprising a mixture of carbon and Teflon (polytrafluoroethylene), sintered onto the catalyzed cloth restricts gas percolation significantly. For some electrochemical processes, such as those involving air electrodes, or other inexpensive active waste gases, the gas-confining coating may be omitted entirely.

In accordance with the invention, in one preferred form, the full opposite side of the catalyzed substrate (the left side in FIG. 1) is conductively attached (e.g. glued) to a structurally supporting full sheet current collector, such as a lead sheet or block 5 or an alloy of lead, silver and calcium, for example, by a conductive adhesive layer 7 as of an epoxy resin containing silver particles, such as the type "Eccobond" 83C manufactured by Emerson-Cuming. Other suitable graphite, silver-plated graphite or gold-plated graphite particles or the like may also be employed. It is especially advantageous to use a graphite-epoxy adhesive in conjunction with a carbon cloth of thickness between 1.0 mm and 3.0 mm wherein a uniform mixture of catalytic carbon or noble metal catalyzed carbon and a hydrophobic binder is adhered to one surface of the carbon cloth and is found partially within its pores, and is bonded to the yarns thereof, leaving the other surface catalyst-free for firm bonding to the graphite epoxy adhesive.

In accordance with the invention, hydrogen gas for this anode is supplied at one or more longitudinally spaced transverse grooves G occupying a very minor portion of the surface or area of the current collector 5. As is more particularly shown in FIG. 2, a thin hydrogen access or inlet groove G is provided near the bottom, extending transversely across the sheet and connected to an inlet passage I in one side edge of the sheet. Similarly, the upper portion of the collector sheet 5 is shown provided with a thin exit groove G' connected to an outlet hole 0 in the upper side edge of the sheet. The dimensions of the full sheet are arbitrary except that its thickness must be sufficient to accommodate the gas access means, e.g. on the order of 0.3 cm to receive the passaged I and O and the grooves G, G'. The total cross section area of the groove(s), G, G', etc. is a minor portion of the area of the sheet 5, and is, typically, kept between 0.1 and 1.0 percent thereof. By way of example, retrofit dimensions (where the gas diffusion assembly replaces the existing conventional lead alloy anode) may be 60 cm × 100 cm × 0.65 cm. Inlet and outlet tubes $T_I$ and $T_O$ may feed and bleed the hydrogen, respectively, to the access or inlet groove G and from the exit groove G'. The full sheet component 5 can be inserted in the cell tank where it is immersed in a typical electrolyte solution E, such as that referred to above, with the solution level above the upper groove G', as indicated at L.

Thus, the hydrogen gas is fed at $T_I$ to one edge of the current collector 5 (left in FIG. 1) and enters into the somewhat larger diameter or cross-section channel or groove G extending transversely across the collector sheet. It has been discovered that this plenum-free limited aperture or groove feed provides, surprisingly, facile and entirely adequate and economical gas diffusion into the juxtaposed electrocatalytic cloth sheet 1, with the gas diffusely and rapidly spreading longitudinally and transversely over the whole surface thereof and fully utilizing the electrocatalytic properties thereof throughout the whole sheet 1 as it receives the electrolyte E on its opposite surface through the gas-confining coating such as the hydrogel membrane coating 3, if used, as explained in said U.S. Pat. No. 4,614,575.

As stated, the electrode assembly of this invention, is to be immersed in an electrolyte solution E in a tank so as to cover at L the hydrogen-bearing grooves as well as the electrocatalytically active portions of the carbon cloth 1 or the like. One face of the electrocatalytically active cloth or the like (shown as the left-hand face in FIG. 1) contacts substantially the entire surface of the face of the full current collector sheet 5 except for the small open areas at which the this grooves G, G' open at the surface of the collector sheet into the cloth. The other face of the cloth 1 (right-hand side) is in contact over its entire area with the electrolyte solution E. In this assembly, the hydrogen (or other gas) is thus carried by the carbon cloth. Optimum mechanical support of the cloth by the full current collector sheet is thus attained with minimal electronic contact resistance. In such assembly construction, moreover, it has been advantageous to select cloths having a thickness in excess of one millimeter and preferably less than three millimeters to cause gas flow without introducing an extensive electric resistance under current densities exceeding ten amperes per square foot.

While the above referred to conductive adhesive is a preferred means of electrically and mechanically connecting the electrocatalytic cloth to the full sheet current collector, other means, such as more of the mechanical means is shown in U.S. Pat. No. 4,248,682 can in some instances be used for the same purpose.

Figure 2:
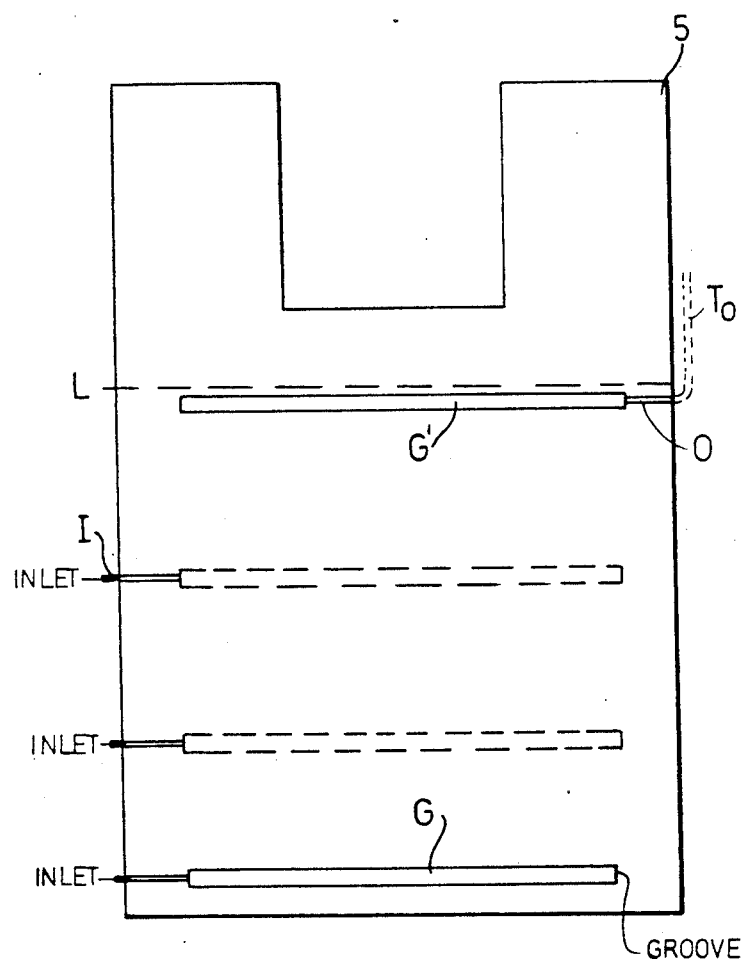
FIG. 2 is a front elevational view showing the current collector sheet of FIG. 1.

In FIG. 2, the electrocatalytic cloth or other sheet 1 is shown provided, also, with non-catalyzed margin portions 1' which are also conductively adhered to the corresponding opposite portions of the current collector 5 as by a conductive epoxy adhesive, for example, and with the right-hand surfaces of the electrode margins 1' also covered by the hydrogel 3, when employed, thereby providing gas-sealing at the edges of the assembly.

SPECIFIC EXAMPLES

The following examples describe a particular full current collector sheet/cloth/membrane assembly and its use in zinc electrowinning with a hydrogen anode. It is noted that a lead alloy is a suitable, preferred current collector in sulfuric acid/metal sulfate electrolytes from which metals including zinc, copper, manganese and others are recovered, because such alloys are passivated by the electrolyte.

EXAMPLE 1

A hydrogen anode assembly was constructed on a Pb/Ca/Ag alloy full sheet, 74 cm×12 cm×0.65 cm, according to FIG. 1. A 2 mm thick carbon cloth, identified by the maker as Textron 213, was catalyzed in accordance with U.S. Pat. No. 4,293,396 and was glued to one face of the full sheet by means of a layer of conducting graphite/epoxy glue, of lesser thinness than that of the cloth, identified by the maker as Mavidon C-41; and the structure was coated with a polymeric gel membrane also of thinness of the order of the carbon cloth, as described in U.S. Pat. No. 4,614,575. The assembly was immersed in a tank containing an electrolyte comprised of 150 g/l sulfuric acid and 70 g/l zinc as zinc sulfate with a cathode blank spaced 2.54 cm from the surface of the anode. The electrolyte temperature was 40° C. and hydrogen gas was passed through the catalyzed carbon cloth at a rate approximately two fold in excess of that required to maintain the desired current density of 430 A/m$^2$. A hydrogen inlet pressure of 105 mm Hg and an outlet pressure of 40 mm Hg were maintained throughout the eight hours of zinc plating. Electrowinning produced a uniform dense zinc sheet strippable from the cathode blank at a current efficiency of approximately 88%. The average anode-to-cathode voltage for the duration of the plating was 1.334 volts.

EXAMPLE 2

When the assembly of Example 1 was run with the hydrogen outlet pressure varied from 0 to 50 mm Hg, the anode to cathode voltage responded in the following manner:

| H$_2$ Outlet Pressure | Current Density | Anode-Cathode Voltage |
| --- | --- | --- |
| none | 430 A/m$^2$ | 1.606 volts |
| 28 mm Hg | 430 A/m$^2$ | 1.368 volts |
| 37 mm Hg | 430 A/m$^2$ | 1.355 volts |
| 50 mm Hg | 430 A/m$^2$ | 1.268 volts |

EXAMPLE 3

An anode was constructed on a Pb/Ca/Ag alloy full sheet according to FIG. 1. The dimensions of the electrode were 75 cm in height and 15 cm in width. A 1 mm thick catalyzed carbon cloth, as for example Stackpole Fiber Co. knitted carbon cloth, was glued to one face of the lead sheet with a conducting silver/epoxy glue and the structure was coated with the polymeric gel membrane identified in Example 1. The assembly was tested in a similar manner to that of Example 1. Electrowinning produced a uniform, dense zinc sheet strippable from the cathode blank at a current efficiency of 86.7%. The average anode-to-cathode voltage for the duration of the plating was 1.214 volts. While the full sheet assemblies have been described and illustrated in the above Examples, using carbon cloth as the electronic conducting gas-carrying substrate, other such gas porous substrates including certain carbon mats and papers are also suitable substrates for the electrocatalytic gas carrier.

In the operation of a cell under a D.C. current with, for example, the full sheet hydrogen anode assembly of this invention, it suffices to supply hydrogen to the inlet without providing a hydrogen outlet, because the anode reaction sucks hydrogen gas into the system by converting the gas to the electrolyte soluble hydrogen ion, producing acid. This suction phenomenon is actually visible by providing an exit groove as well as an excess of hydrogen. The exit evolution rate of hydrogen prior to passing the current is sharply reduced when under current, and can be stopped entirely by increasing the current.

In practice, a hydrogen outlet is often desirable as it provides the means to supply an excess of hydrogen over that amount required for the current. The hydrogen can then be pressurized at will to prevent (or at least minimize) flooding of the electrocatalytic cloth or the like thereby to attain the improvement in voltage, as shown in Example 2. Here, the exit groove G' serves to remove the unused excess hydrogen, preferably for recycling, and the pressure is readily controllable at the exit. A similar consideration holds for oxygen (air) cathodes using the full sheet assembly. A typical full sheet oxygen cathode is useful in the cathodic production of hydrogen peroxide in sodium hydroxide solution, for example. Because of the lower diffusivity of oxygen (vs. that of hydrogen), the oxygen pressure needs to be adjusted to the current to be drawn to insure uniform oxygen distribution across the surface of a carbon-catalyzed cloth or the like. (Noble metal catalyst must be avoided here as they decompose the peroxide.) When air is the source of oxygen this adjustment becomes even more critical due to the diluting effect of the nitrogen. Here, it is desirable to shorten the path of the air, or less so of oxygen, in the full sheet assembly. For example, by utilizing full sheets of greater width than height, the appropriate relative dimensions are readily determined experimentally at different current densities and with different width-to-height electrode assemblies. Yet another way to control the length of the gas (e.g. air) path is to provide more than one gas access on the same sheet, their number being readily determined by experimentation with any given geometric full sheet configuration.

As before stated, another cathodic application is in the production of chlorine and caustic comprising an ion-exchange membrane, wherein the cathode is the electrode assembly above-described, with oxygen or air (preferably $CO_2$-free) employed.

Yet another use of the full sheet/cloth assembly involves a bi-polar plate, such as, for example, a nickel plate in an alkaline metal oxygen (air) battery. Here, the cathodic face of the nickel plate full sheet is in contact with the electrocatalytic cloth and oxygen (air) is fed thereto. The other face is in contact with the "anodic" metal, e.g. lithium, aluminum, etc.

Other varieties and uses of the assembly of this invention will occur to those skilled in the art as well as alternate modes of effecting the full sheet contact including other varieties of conducting glues, silver epoxy adhesion points spaced sufficiently closely to permit liquid and/or open plastic screen pressure to insure substantially full sheet/cloth contact; such being considered within the scope of the appended claims.

I claim:

1. A gas-diffusion electrode assembly for use in an aqueous electrolyte solution, comprising:
   an electronically conductive support formed from a solid metal with a generally rectangular flat continuous surface and edges bounding said surface, said support being formed with:
   a generally rectilinear narrow supply groove extending along and close to one of said edges and opening at said surface,
   a supply passage opening through another of said edges into one end of said supply groove,
   a generally rectilinear narrow discharge groove extending along and close to an edge of said support opposite said one of said edges and opening at said surface, and
   an outlet opening at an edge of said support and communicating with one end of said discharge groove for discharging gas entering said discharge groove,
   said supply and discharge grooves having open areas at said surface collectively constituting a small fraction of a continuous area of said surface between said grooves, said grooves being each of a constant width which is substantially less than a spacing between grooves of said support;
   an electrocatalytic gas-carrying and gas-diffusing electronically conductive sheet juxtaposed with said surface and substantially coextensive therewith;
   an electrically conductive adhesive bonding said sheet to said surface over substantially all of said continuous area and between and around said grooves so that said supply groove opens into and communicates directly with said electrocatalytic gas-carrying electronically conductive sheet and said discharge groove receives gas to be discharged therefrom;
   means for introducing a gas into said supply passage and said supply groove for diffusion through said sheet in a plane thereof parallel to said surface substantially throughout said web, a gas-confining coating of an aqueous polymeric hydrogel membrane on a surface of said electrocatalytic gas-carrying electronically conductive sheet opposite that bonded to said support by said electrically conductive adhesive,
   said sheet having a thickness of substantially 1 mm to 3 mm,
   said membrane having a thickness of the order of that of said sheet, said adhesive is a layer thinner than said sheet,
   said support having a thickness of substantially 0.3 cm, and
   said grooves collectively having areas opening at said surface of said support of between 0.1 and 1.0 percent of an area of said surface of said support.

2. The gas-diffusion electrode assembly for use in an aqueous electrolyte solution defined in claim 1 wherein said electrocatalytic gas-carrying electronically conductive sheet comprises a catalyzed carbon cloth or paper.

3. The gas-diffusion electrode assembly for use in an aqueous electrolyte solution defined in claim 2 wherein said electrocatalytic gas-carrying electronically conductive sheet is peripherally uncatalyzed and said gas confining coating of an aqueous polymeric hydrogel membrane extends to a periphery of said sheet.

4. The gas-diffusion electrode assembly defined in claim 1 wherein said adhesive is an epoxy resin containing conductive particles selected from the group which consists of silver, graphite, silver-plated graphite, gold-plated graphite and mixtures thereof.

5. The gas-diffusion assembly defined in claim 1 wherein said support is composed of lead or a lead alloy.

6. A current-carrying electrolysis cell for electrowinning of a metal selected from the group which consists of zinc, copper, manganese and cadmium comprising the electrode assembly of claim 1 wherein said electrode assembly is anodic and said gas is hydrogen.

7. A current-carrying electrolysis cell for recovery of chlorine and caustic, comprising an ion-exchange membrane and a cathode constituted by the electrode assembly of claim 1 wherein the electrode assembly is cathodic and said gas is $CO_2$-free oxygen or air.

8. A gas-diffusion electrode assembly for use in an aqueous electrolyte solution, comprising:
   a solid metal electronically conductive support formed with a generally rectangular flat continuous surface and edges bounding said surface, said support being formed with access means opening at said surface and of an open area at said surface constituting a small fraction of a continuous area of said surface, said access means being constituted by transversely spaced grooves formed in said plate and having widths substantially less than a spacing between them;
   an electrocatalytic gas-carrying and gas diffusing electronically conductive sheet juxtaposed with said surface and substantially coextensive therewith;
   an electrically conductive adhesive bonding said sheet to said surface over substantially all of said continuous area and around said access means so that said access means opens into and communicates directly with said electrocatalytic gas-carrying electronically conductive web; sheet, said adhesive being an epoxy resin containing conductive particles selected from the group which consists of silver, graphite, silver-plated graphite, gold-plated graphite and mixtures thereof;

means for introducing a gas into said access means for diffusion through said sheet in a plane thereof parallel to said surface substantially throughout said sheet and a gas-confining coating of an aqueous polymeric hydrogel membrane on a surface of said electrocatalytic gas-carrying electronically conductive sheet opposite that bonded to said support by said electrically conductive adhesive, wherein said sheet having a thickness of substantially 1 mm to 3 mm, said membrane having a thickness of the order of that of said sheet, said adhesive is a layer thinner than said sheet, said support having a thickness of substantially 0.3 cm, and said grooves having areas opening at said surface of said support of between 0.1 and 1.0 percent of an area of said surface of said support.

9. The gas-diffusion electrode assembly for use in an aqueous electrolyte solution defined in claim 8 wherein said electrocatalytic gas-carrying electronically conductive sheet comprises a catalyzed carbon cloth or paper.

10. The gas-diffusion electrode assembly for use in an aqueous electrolyte solution defined in claim 9 wherein said electrocatalytic gas-carrying electronically conductive sheet is peripherally uncatalyzed and said gas confining coating of an aqueous polymeric hydrogel membrane extends to a periphery of said sheet.

11. The gas-diffusion assembly defined in claim 8 wherein said support is composed of lead or a lead alloy.

12. A current-carrying electrolysis cell for electrowining of a metal selected from the group which consists of zinc, copper, manganese and cadmium comprising the electrode assembly of claim 8 wherein said electrode assembly is anodic and said gas is hydrogen.

13. A current-carrying electrolysis cell for recovery of chlorine and caustic, comprising an ion-exchange membrane and a cathode constituted by the electrode assembly of claim 8 wherein the electrode assembly is cathodic and said gas is $CO_2$-free oxygen or air.

* * * * *